(12) United States Patent
Ziemek

(10) Patent No.: US 6,321,431 B1
(45) Date of Patent: *Nov. 27, 2001

(54) PROCESS AND DEVICE FOR REMOVING OXIDE SKIN FROM METAL STRIPS

(76) Inventor: Gerhard Ziemek, Bunzlauer Strasse 6, D-30853 Langenhagen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,644

(22) Filed: Sep. 10, 1998

(30) Foreign Application Priority Data

Sep. 11, 1997 (DE) .............................. 197 39 895

(51) Int. Cl.[7] ...................................... B23P 15/00

(52) U.S. Cl. .................. 29/81.12; 29/81.17; 29/33 A; 29/33 D

(58) Field of Search ................ 29/81.05, 81.11, 29/81.12, 81.13, 81.16, 81.03, 81.17, 33 D, 33 A, 81.01; 451/182, 190, 194, 110; 409/139, 140

(56) References Cited

U.S. PATENT DOCUMENTS

| 1,062,248 | * | 5/1913 | Mueller | 29/DIG. 79 X |
| 4,575,970 | * | 3/1986 | Kozai et al. | 451/182 X |
| 4,827,676 | * | 5/1989 | Kindermann | 451/194 X |
| 5,205,686 | * | 4/1993 | De Caussin | 29/DIG. 94 X |

FOREIGN PATENT DOCUMENTS

| 28 658 | | 5/1964 | (DE) . | |
| 638390A1 | * | 12/1994 | (EP) . | |
| 0638390A1 | | 8/1994 | (EP) . | |
| 565994 | * | 12/1944 | (GB) | 29/81.05 |
| 800436 | * | 8/1958 | (GB) | 29/81.03 |
| 2072068 | * | 9/1981 | (GB) | 29/81.03 |
| 6277742 | * | 10/1994 | (JP) | 29/81.01 |

* cited by examiner

Primary Examiner—I Cuda-Rosenbaum
(74) Attorney, Agent, or Firm—Collard & Roe, P.C.

(57) ABSTRACT

A method and device for A process for removing oxide skin from cut surfaces of a thin-walled metal strip used for preparing strip material for welded pipes. The invention comprises passing the metal strip between pairs of rotating cutting tools and applying a low self-adjusting working pressure to the cut surfaces with the tools. During this process, the temperature of the metal strip is maintained below 80° C. to prevent the oxide skin from redepositing.

12 Claims, 1 Drawing Sheet

PROCESS AND DEVICE FOR REMOVING OXIDE SKIN FROM METAL STRIPS

BACKGROUND OF THE INVENTION

1. Field of the Invention

This invention relates to a process and a device for removing the oxide skin from the cut edges of a thin-walled, metal strip that is cut for preparing strip material for the manufacture of welded pipes.

2. The Prior Art

In the processing of thin-walled metal strips for the manufacture of welded pipes, cable sheaths and outer conductors of coaxial cables, it is a common practice to trim the edges of the strip immediately prior to the welding step. Trimming the strip allows it to be cut to the exact dimensions required for the desired pipe or tube diameter. The oxide on the cut edge is eliminated by the cutting process at the same time, so that the welding process is optimized.

The roller shears used for the trimming require a minimum width to execute the cut. Otherwise, they cannot cut properly. The width of the waste strip normally amounts to 2 to 4 mm on each edge of the metal strip. Therefore, the smaller the desired diameter of the pipe, the greater the ratio of waste to pipe material produced during trimming.

Such losses have been accepted as unavoidable in the past because manufacturers could not rely on being supplied with exactly cut strips and had to provide for exact dimension themselves. This situation has changed recently and operators of pipe welding installations can now cut the strips in their own plants so as to exactly control the quality of the cutting edge and the exact width of the strip. Furthermore, some companies advertising the most exact cutting width have gained their own market share, as they cut large amounts of strip for the manufacture of pipes, so that they were able to acquire great technical expertise. Tests with exactly pre-cut strips have shown that it is possible to weld pipes without any prior trimming. Substantial savings are achieved this way in mass production, and represent a clear competitive edge.

However, it was found in tests that the extremely exact cutting of the starting material fails to satisfy the second important precondition for a good manufacturing result if the product must be stored prior to use. Depending on the material involved, the duration of storage and the storage conditions such as temperature and humidity, an oxide skin of varying thickness develops on the surface of the cuts. This skin interferes with the welding process and may even impede it.

SUMMARY OF THE INVENTION

It is therefore an object of the invention to develop a process for the economical removal of oxides on the surfaces of the cuts of a metal strip that has been exactly trimmed. It is another object of the invention to develop a device that carries out this process in a technically simple manner.

These and other objects are accomplished by passing the metal strip between pairs of rotating cutting tools. The tools apply a low, self-adjusting contact pressure to the cut surfaces of the strips. The surface temperature of the material being treated is maintained below 80° C. in the course of this process.

There are at least two cutting tools for carrying out this process. The tools rest against the cut surfaces of a metal strip that has been cut under low pressure. The tools are movable back and forth, reciprocating perpendicular to the plane of the cut surface. The reciprocating motion is accomplished via motors driven by compressed air or electro motors. The tools may also be pivot-mounted for swinging against the edges to be worked. The contact pressure of the cutting tools may be varied through the use of adjustable counterweights. The removed material can be removed from the metal strip via a suction device. To accomplish this, the entire device may be enclosed in a housing with a suction connection. The space within the housing is preferably filled with an inert or slightly reducing protective gas.

Steel brushes or grinding heads fitted with abrasive material can be used as cutting tools. Suitable tools for this purpose are sand papers, which are chucked across grinding heads or grinding belts. The reciprocating motion of the cutting tool prevents the narrow edges of the cut from working themselves into the cutting tools. If steel brushes are used, reversing the direction of rotation ensures that the brushes will not become blunt due to bending of the individual wires.

In the process according to the invention, from 1 $\mu$m to 100 $\mu$m of oxide deposits are removed from the cut edges.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
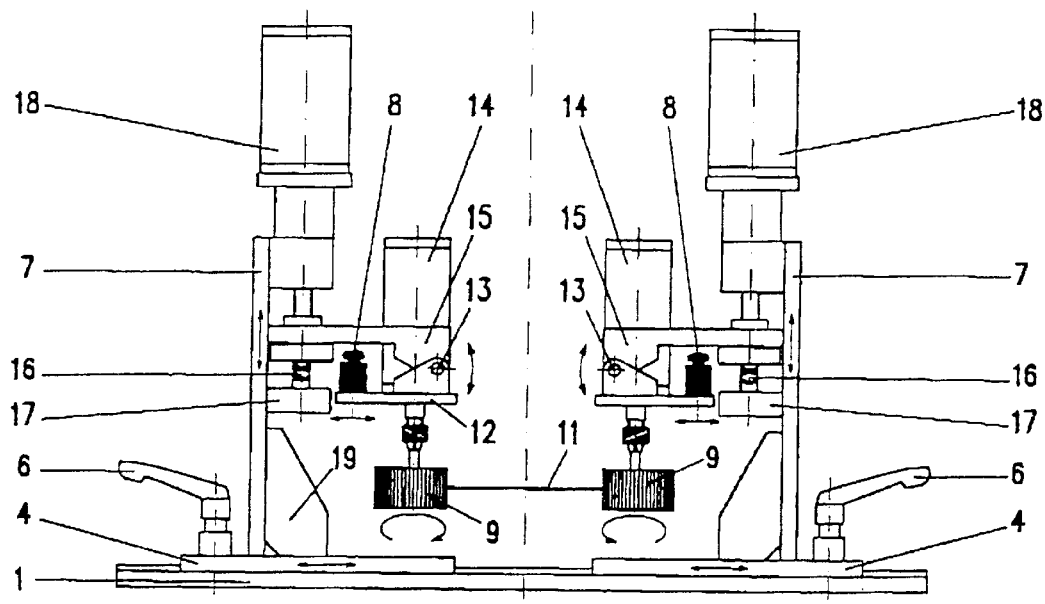
FIG. 1 shows a side view of the device according to the invention having two pairs of tools in the direction in which the metal cut to be worked is advanced.
Figure 2:
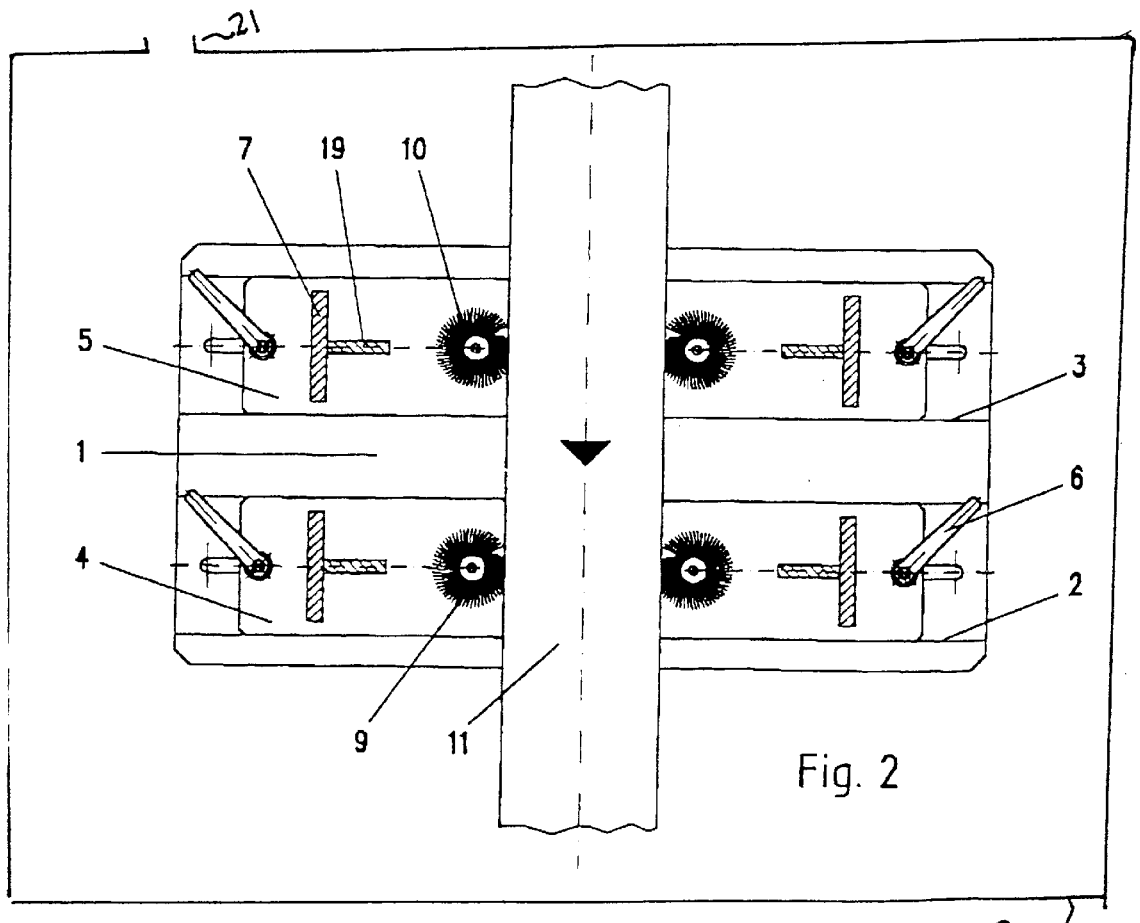
FIG. 2 shows a horizontal section through an alternative embodiment of the device according to the invention.

Referring now in detail to the drawings and, in particular, FIGS. 1 and 2, there are shown carriages 4 and 5 displaceably arranged on a base plate 1 with two guide grooves 2 and 3. Carriages 4 and 5 are lockable with clamping levers 6.

Vertical guide sections 7 are arranged on the carriages. The cutting tools, which are shown in FIG. 1 as rotating grinding heads 9 fitted with sand paper and as metal brushes 10 in FIG. 2, are additionally movable up and down on the vertical sections. A metal strip 11 is passed through between the pair of grinding heads 9 in the direction of the arrow indicating movement.

Each grinding head 9 is rotatably mounted on a holding plate 12, turning around its vertical axis. Holding plate 12 can be swivelled around pivot point 13. Pivot point 13 is arranged spaced from the axis of rotation, so that a tilting movement is obtained that is directed against the edge of the metal strip. Grinding heads 9 are driven by driving motors 14. Driving motors 14 and holding plates 12 are supported by support plates 15, which in turn are movable up and down on vertical guide sections associated with support plates 15.

A spindle 16 having oppositely directed threads serves for vertical adjustment of the alternating vertical movement of the tools in the course of the working process. Spindle 16 is supported on a support plate 17. Each of the tools are driven by a motor 18. The vertical guide sections 7 are supported by bent metal sheets 19, which are mounted at their lower ends on the carriage, which are vertically displaceable relative to the advancing direction of the strip.

To work the cut edges of metal strip 11, the rotary speed of the brushes 10 or rollers 9 is coordinated with the feeding speed of the strip in such a way that the cutting surfaces of the strip edges remain below a temperature of 80° C., as re-oxidizing would otherwise occur after the deoxidizing process. It is therefore important that the pressure at which the tools are pressed against the edges of the strip is adjusted in a precise manner. This adjustment can be made with counterweights 8, which counteract the tilting moment of the tools and permit the working tools to act on the surfaces of the cut with only a few grams (<1 N) pressure force.

If several cutting tools are used on one edge of the strip, it is possible to change tools or grinding heads that have become blunt, in the course of the subsequent working process, such as in the welding process, without having to interrupt the continuous manufacturing process. Depending on the type of material involved, the tools must be capable of removing from 1 $\mu$m to 100 $\mu$m continuously and without any heating, if possible. The thickness of the material removed is determined by the thickness of the oxide layer. To prevent the edges of the workpiece from grinding circumferential grooves into the tools, the tools are constantly moved up and down in the course of the working process by the driving motors 18 via a double-threaded spindle 16.

The metal dust produced by the working process can be constantly removed by suction equipment (not shown), so that ambient air is not polluted by the metal dust. A simple solution is to encase the entire device in a housing 20 that completely encloses the device and from which the metal dust can be removed via a suction conduit 21 in a controlled manner.

With extremely thick oxide layers, the temperature of the edges can reach critically high values. To avoid such temperatures, the encapsulated space can be filled with an inert or slightly reducing protective gas. The use of housing 20 encapsulating the device is preferred even if only for this reason.

Accordingly, while only a few embodiments of the present invention have been shown and described, it is obvious that many changes and modifications may be made thereunto without departing from the spirit and scope of the invention.

What is claimed is:

1. A process for removing oxide skin from cut surfaces of a thin-walled metal strip, used for preparing strip material for welded pipes, said strip having a top planar surface, a bottom planar surface, and two cut side surfaces disposed between the top planar surface and the bottom planar surface, comprising:

passing the metal strip between pairs of rotating cutting tools having axes of rotation at a right angle to the top and bottom planar surfaces of the metal strip and a reciprocating up and down movement perpendicular to the planar surfaces, and wherein the tools contact the two cut side surfaces simultaneously to remove the oxide skin having a thickness of 1 $\mu$m to 100 $\mu$m from both sides of the strip simultaneously;

applying a low self-adjusting working pressure of a few grams to the two cut side surfaces with the tools; and maintaining the temperature of the metal strip below 80° C. by controlling the speed of the cutting tools, controlling the working pressure of the tools and controlling the feed of the workpiece.

2. The process as claimed in claim 1, wherein 1 $\mu$m to 100 $\mu$m of oxide skin is removed from the cut surfaces.

3. A device for removing oxide skin having a thickness of between 1 $\mu$m and 100 $\mu$m from cut surfaces of a thin-walled metal strip used for preparing strip material for welded pipes, wherein the metal strip has a top planar surface, a bottom planar surface, and two cut side surfaces disposed between the top planar surface and the bottom planar surface, the device comprising;

at least two rotating cutting tools resting with low pressure of a few grams simultaneously against the two cut side surfaces of both sides of the metal strip, said tools adapted to move up and down in a reciprocating movement perpendicular to the top and bottom planar surfaces of the metal strip, and said tools having an axis of rotation directed perpendicular to the top and bottom planar surfaces of the metal strip.

4. The device according to claim 3, wherein the direction of rotation of the cutting tools is reversible.

5. The device according to claim 3, wherein the cutting tools are steel brushes.

6. The device according to claim 3, wherein the cutting tools are grinding heads fitted with abrasive material.

7. The device according to claim 3, wherein the cutting tools are pivot-mounted to swing against the cut edges.

8. The device according to claim 7, further comprising adjustable counterweights connected to the cutting tools for varying the contact pressure of the cutting tools.

9. The device according to claim 3, further comprising a suction device for removing removed material.

10. The device according to claim 9, further comprising a housing enclosing the device, said housing having a suction connection.

11. The device according to claim 10, wherein the space within the housing is filled with a gas selected from the group consisting of inert gas and slightly reducing protective gas.

12. The device according to claim 3, further comprising motors driven by compressed air for driving the cutting tools and executing the reciprocating movements.

* * * * *